(12) United States Patent
Aoki

(10) Patent No.: US 8,154,751 B2
(45) Date of Patent: Apr. 10, 2012

(54) PRINTING ACCORDING TO PRIORITY OF PLURALITY OF INPUT INTERFACES

(75) Inventor: Kazuma Aoki, Aichi (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 495 days.

(21) Appl. No.: 12/130,077

(22) Filed: May 30, 2008

(65) Prior Publication Data

US 2008/0297843 A1 Dec. 4, 2008

(30) Foreign Application Priority Data

Jun. 1, 2007 (JP) ................................. 2007-146960

(51) Int. Cl.
*G06F 3/12* (2006.01)

(52) U.S. Cl. ........................................ 358/1.15; 358/1.9

(58) Field of Classification Search ........................ None
See application file for complete search history.

(56) References Cited

U.S. PATENT DOCUMENTS

| | | | | |
|---|---|---|---|---|
| 5,774,356 A | * | 6/1998 | Hisatake et al. | 700/28 |
| 6,151,464 A | * | 11/2000 | Nakamura et al. | 399/79 |
| 6,452,692 B1 | * | 9/2002 | Yacoub | 358/1.15 |
| 6,940,616 B1 | * | 9/2005 | Irisa | 358/1.15 |
| 7,180,637 B2 | * | 2/2007 | Tanimoto | 358/402 |
| 7,206,830 B2 | * | 4/2007 | Yamazaki | 709/223 |
| 7,216,347 B1 | * | 5/2007 | Harrison et al. | 718/103 |
| 2001/0013053 A1 | * | 8/2001 | Yamazaki | 709/203 |
| 2003/0020953 A1 | * | 1/2003 | Van Den Tillaart et al. | 358/1.15 |
| 2003/0103777 A1 | * | 6/2003 | Nakamura et al. | 399/82 |
| 2004/0105111 A1 | * | 6/2004 | Guddanti | 358/1.13 |
| 2005/0012770 A1 | * | 1/2005 | Endo | 347/19 |
| 2005/0185208 A1 | * | 8/2005 | Murata | 358/1.14 |
| 2005/0213149 A1 | * | 9/2005 | Kuwahara | 358/1.15 |
| 2006/0203282 A1 | | 9/2006 | Iwai | |
| 2006/0221391 A1 | * | 10/2006 | Okazawa et al. | 358/1.15 |
| 2006/0274348 A1 | * | 12/2006 | Suzuki | 358/1.13 |
| 2007/0046989 A1 | * | 3/2007 | Shima | 358/1.15 |
| 2007/0285709 A1 | * | 12/2007 | Yamasaki et al. | 358/1.15 |

(Continued)

FOREIGN PATENT DOCUMENTS

JP 08-234942 A 9/1996

(Continued)

OTHER PUBLICATIONS

Notification of Reasons of Rejection in Japanese Application No. 2007-146960 mailed Apr. 21, 2009 and English translation thereof.

*Primary Examiner* — King Poon
*Assistant Examiner* — Dung Tran
(74) *Attorney, Agent, or Firm* — Banner & Witcoff, Ltd.

(57) ABSTRACT

A printing device includes a plurality of sorts of interfaces each of which is configured to receive therethrough a print job sent by a sending source device, a printing unit configured to perform a printing operation for the print job received by each of the interfaces, a determining unit configured to determine a print priority of each of the print jobs based on a sort of an interface through which the print job is received, a control unit configured to control the printing unit to preferentially perform a printing operation for a print job with a higher print priority given thereto by the determining unit.

14 Claims, 12 Drawing Sheets

PRINT PRIORTY TABLE

| PRINT REQUESTING SOURCE | PRINT PRIORITY ORDER | ESTIMATED MOVEMENT TIME |
|---|---|---|
| FIRST CONNECTION TERMINAL (USB HOST) | 1 | 0 min |
| SECOND CONNECTION TERMINAL (USB FUNCTION) | 2 | 1 min |
| IDENTICAL LAN SUBNET | 3 | 3 min |
| LAN SUBNET 192.168.2 | 4 | 5 min |
| LAN SUBNET 192.168.3 | 4 | 10 min |
| LAN SUBNET 192.168.4 | 4 | 15 min |

U.S. PATENT DOCUMENTS

2008/0162242 A1* 7/2008 Schneur et al. .................... 705/9
2008/0225326 A1* 9/2008 Kephart et al. .............. 358/1.15

FOREIGN PATENT DOCUMENTS

| JP | 11-272437 A | 10/1999 |
| JP | 2000-020266 | 1/2000 |
| JP | 2000020266 A * | 1/2000 |
| JP | 2003-058356 A | 2/2003 |
| JP | 2003058356 A * | 2/2003 |
| JP | 2004-009499 A | 1/2004 |
| JP | 2004-110338 * | 4/2004 |
| JP | 2006-251863 A | 9/2006 |

* cited by examiner

PRINT JOB TABLE

| RECEPTION ORDER | STATUS | STORAGE ADDRESS | POINTER | REMAINING TIME | PRINT COMPLETION TIME | PRINT REQUESTING SOURCE | NUMBER OF INTERRUPTIONS |
|---|---|---|---|---|---|---|---|
| 1 | NOW PRINTING | ADDR_A | OFF_A | 300 | 10:10 | LAN SUBNET 192.168.4 | 0 |
| 2 | WAITING TO BE PRINTED | ADDR_B | OFF_B | 10 | 10:00 | FIRST CONNECTION TERMINAL (USB HOST) | 0 |
| 3 | WAITING TO BE PRINTED | ADDR_C | OFF_C | 20 | 10:15 | SECOND CONNECTION TERMINAL (USB FUNCTION) | 0 |
| 4 | NOW RECEIVING | ADDR_D | 0 | UNKNOWN | UNKNOWN | IDENTICAL LAN SUBNET | 0 |

FIG. 3

PRINT PRIORTY TABLE

| PRINT REQUESTING SOURCE | PRINT PRIORITY ORDER | ESTIMATED MOVEMENT TIME |
|---|---|---|
| FIRST CONNECTION TERMINAL (USB HOST) | 1 | 0 min |
| SECOND CONNECTION TERMINAL (USB FUNCTION) | 2 | 1 min |
| IDENTICAL LAN SUBNET | 3 | 3 min |
| LAN SUBNET 192. 168.2 | 4 | 5 min |
| LAN SUBNET 192. 168.3 | 4 | 10 min |
| LAN SUBNET 192. 168.4 | 4 | 15 min |

FIG. 4

PRINTING ACCORDING TO PRIORITY OF PLURALITY OF INPUT INTERFACES

CROSS-REFERENCE TO RELATED APPLICATION

This application claims priority under 35 U.S.C. §119 from Japanese Patent Application No. 2007-146960 filed on Jun. 1, 2007. The entire subject matter of the application is incorporated herein by reference.

BACKGROUND

1. Technical Field

The following description relates to one or more printing devices that have a plurality of sorts of interfaces configured to accept therethrough data to be printed with a printing mechanism (printer engine).

2. Related Art

For example, according to the disclosure of Japanese Patent Provisional Publication No. 2000-20266 (hereinafter referred to as '266 Publication), when a plurality of computers are connected with a printing device (printer) via a network line such as an Ethernet (trademark registered), the printer is configured as follows. The printer transmits an ICMP (Internet Control Message Protocol) packet having a return transmission request from an NIC (Network Interface Card) thereof to the computers. Then, the printer detects a distance between itself and each computer based on a transmission-reception time of the ICMP packet. Thus, the printer puts higher priority on a print request issued by a computer closer therefrom and performs a printing operation in response to the print request.

SUMMARY

However, since the printer disclosed in '266 Publication detects the distance between itself and each computer based on the transmission-reception time of the ICMP packet, the technique cannot unfortunately be applied to devices other than devices connected with the printer via the network cable.

Aspects of the present invention are advantageous in that there can be provided one or more improved printing devices that can meet various sorts of connection conditions and respond to print requests issued by a plurality of devices.

According to aspects of the present invention, there is provided a printing device, which includes a plurality of sorts of interfaces each of which is configured to receive therethrough a print job sent by a sending source device, a printing unit configured to perform a printing operation for the print job received by each of the interfaces, a determining unit configured to determine a print priority of each of the print jobs based on a sort of an interface through which the print job is received, a control unit configured to control the printing unit to preferentially perform a printing operation for a print job with a higher print priority given thereto by the determining unit.

In some aspects, the print priority of a print job can be determined based on a sort of an interface through which the print job. Therefore, it is possible to meet various sorts of connection conditions and respond to print requests transmitted by a plurality of sending source devices.

According to another aspect of the present invention, there is provided a method applicable to a printing device configured to receive print jobs through a plurality of sorts of interfaces, the method including the steps of determining a print priority of each of the print jobs based on a sort of an interface through which the print job is received, and preferentially performing a printing operation for a print job with a higher print priority given thereto in the determining step.

According to the method configured as above, the same effects as the aforementioned printing device can be provided.

According to a further aspect of the present invention, there is provided a computer readable medium having computer readable instructions stored thereon, which cause a computer, configured to receive print jobs through a plurality of sorts of interfaces, to perform the steps of determining a print priority of each of the print jobs based on a sort of an interface through which the print job is received, and preferentially performing a printing operation for a print job with a higher print priority given thereto in the step of determining the print priority.

With the computer readable medium configured as above, the same effects as the aforementioned printing device can be provided.

BRIEF DESCRIPTION OF THE ACCOMPANYING DRAWINGS

FIG. 3 is an example of a print job table in the first embodiment according to one or more aspects of the present invention.

FIG. 4 is an example of a print priority table in the first embodiment according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, embodiments according to aspects of the invention will be described with reference to the accompanying drawings.

(First Embodiment)

1. Brief Overview of Printer (see FIG. 1)

Figure 1:
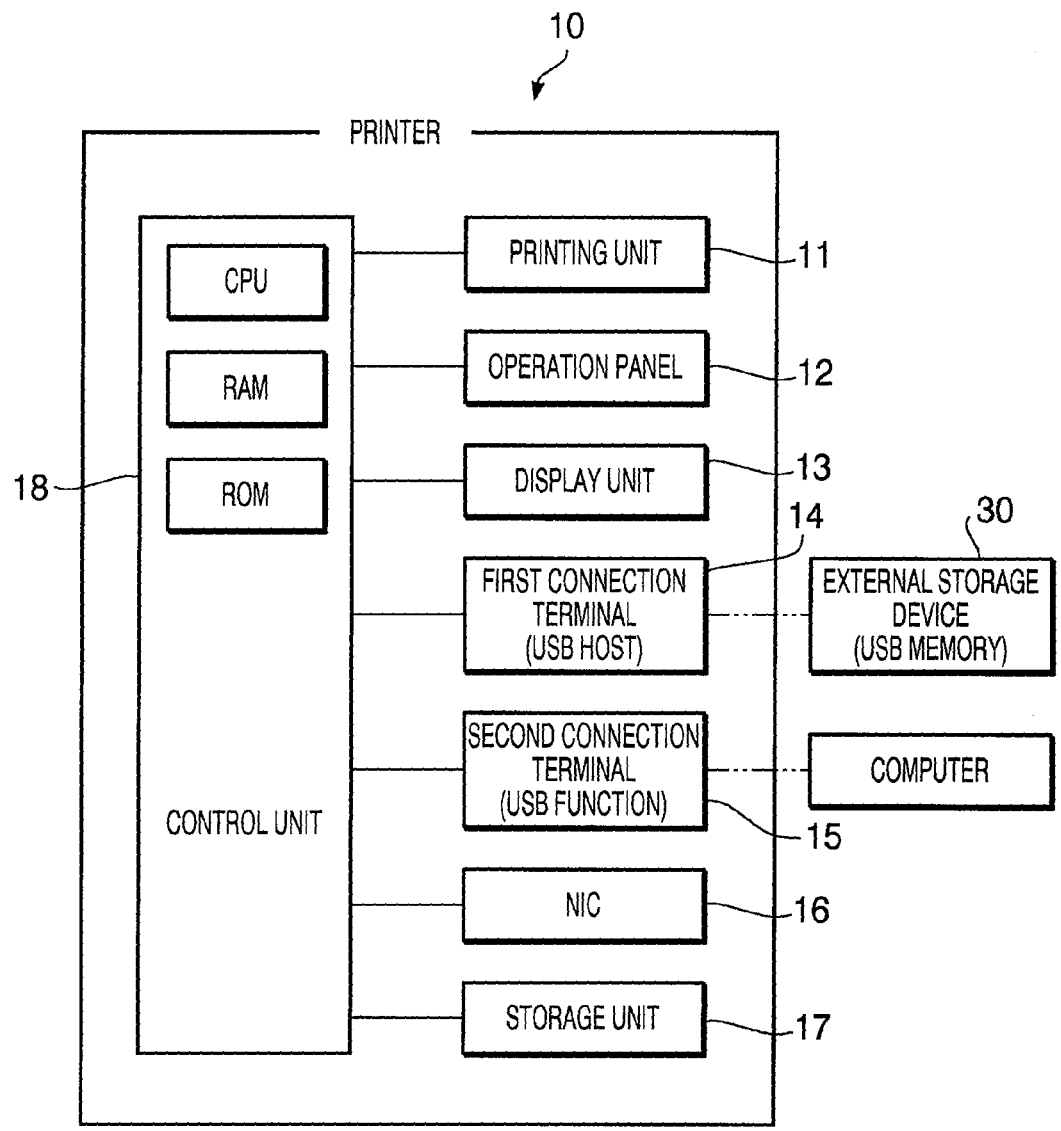
FIG. 1 is a block diagram of a printer (image forming device) in a first embodiment according to one or more aspects of the present invention.

FIG. 1 is a block diagram schematically showing a configuration of a printer (image forming device) 10 according to aspects of the present invention. As shown in FIG. 1, the printer 10 is provided with a printing unit 11 configured to form an image on a recording medium such as a recording paper, operation panel 12 to be operated by a user of the printer 10, display unit 13 configured to display various information, first connection terminal 14 to which an external storage device 30 such as a USB memory is detachably connected, second connection terminal 15 to which a self-controllable device such as a computer is connected, interface for network connection such as a NIC (Network Interface Card) 16, storage unit 17 configured to store thereon various information, and control unit 18 configured to control the above components connected therewith such as the printing unit 11.

It is noted that the control unit 18 is configured with a widely-known microcomputer that includes a CPU, ROM, and RAM, and programs for executing below-mentioned control processes are stored in the ROM. Further, the storage unit 17 is configured with a rewritable non-volatile storage means such as a flash ROM.

Further, in the present embodiment, a connection terminal (interface) conforming to a USB (Universal Serial Bus) standard is employed as the first connection terminal 14. However, the first connection terminal 14 of the present embodiment is not limited to such a USB interface, and may be a connection terminal conforming to any of other standards.

In addition, the external storage device 30 may be any storage means including an interface connectable with the first connection terminal 14. Specifically, there can be cited as the external storage device 30, a USB memory and SD memory (trademark registered) configured with a non-volatile semiconductor storage device such as a flash memory, magnetic storage device such as an HDD, and digital camera conforming to a communication standard PictBridge to perform a printing operation in a state directly connected with the printer 10.

Furthermore, in the present embodiment, a connection terminal (interface) conforming to the USB standard is employed as the second connection terminal 15. However, the second connection terminal 15 of the present embodiment is not limited to such a USB interface.

Additionally, the printer 10 has a function of directly printing a print data file stored in the external storage device 30 connected with the first connection terminal 14 without involving a computer (hereinafter referred to as direct printing).

It is noted that the print data file is a data file of a specific format such as PDL (Page Description Language) that is executable by the printer 10. The printer 10 of the present embodiment can perform direct printing of an image data file conforming to a BMP (Bit Map) format or JPEG (Joint Photographic Experts Group) format as well as the print data file.

2. Control of Printer 2.1. Connection Environment of Printer

Figure 2:
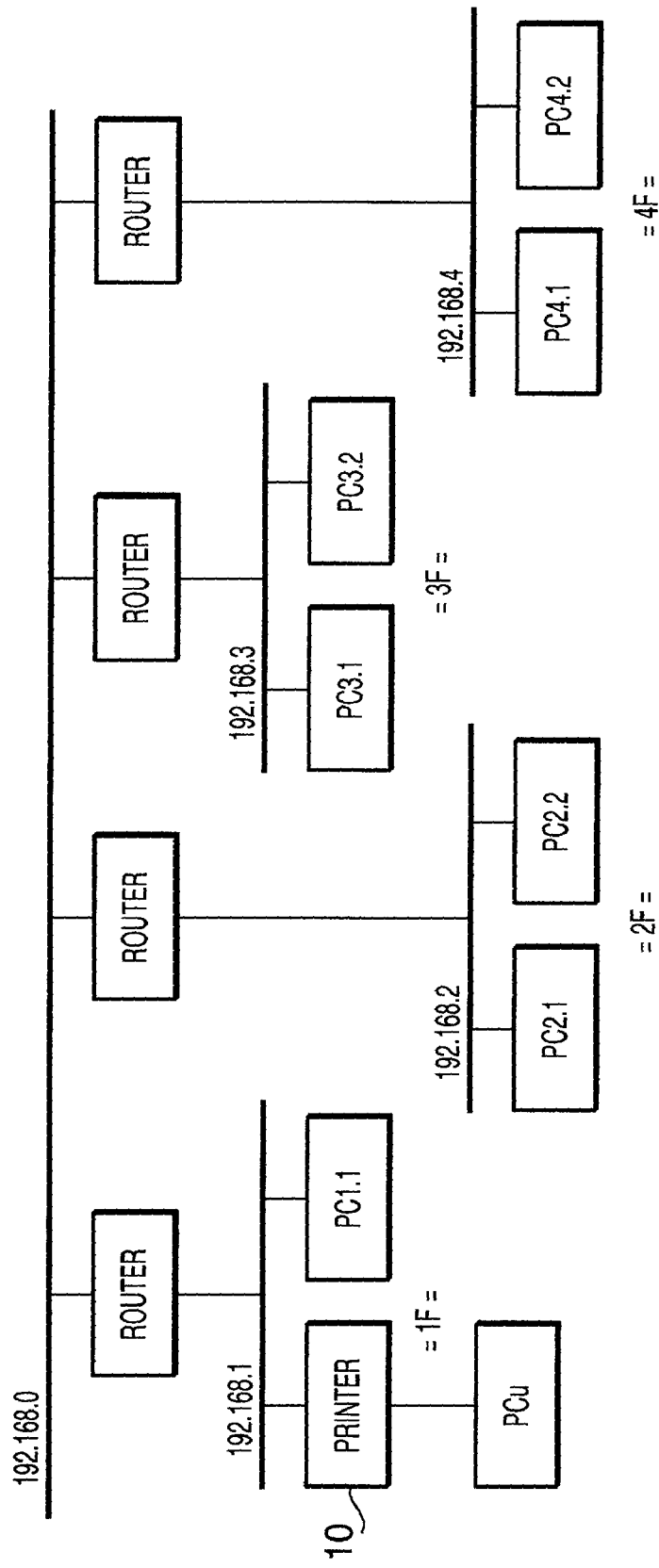
FIG. 2 is an example of a connection environment of the printer in the first embodiment according to one or more aspects of the present invention.

FIG. 2 is an example of a connection environment of the printer 10. Hereinafter, there will be explained operations of the printer 10, assuming an environment in which the single printer 10 is connected with (shared by) a plurality of computers via the network and a single computer is directly connected with the second connection terminal 15 without involving the network.

In FIG. 2, "PCu" denotes a computer connected with the printer 10 via the second connection terminal 15. In addition, "PC1. 1," "PC2. 1," and the like denote computers connected with the printer 10 via the network.

Additionally, "PC1. 1" represents a computer belonging to a subnet of an IP address "192. 168. 1." "PC2. 1" and "PC2. 2" represent computers belonging to a subnet of an IP address "192. 168. 2." "PC3. 1" and "PC3. 2" represent computers belonging to a subnet of an IP address "192. 168. 3." "PC4. 1" and "PC4. 2" represent computers belonging to a subnet of an IP address "192. 168. 4."

Incidentally, a router is a device for connecting a device belonging to a subnet to another subnet. In the present embodiment, a subnet is configured on each floor, and thus devices belonging to respective different subnets are physically farther away from each other than devices on the same subnet.

2.2. Print Job Table

Figure 5:
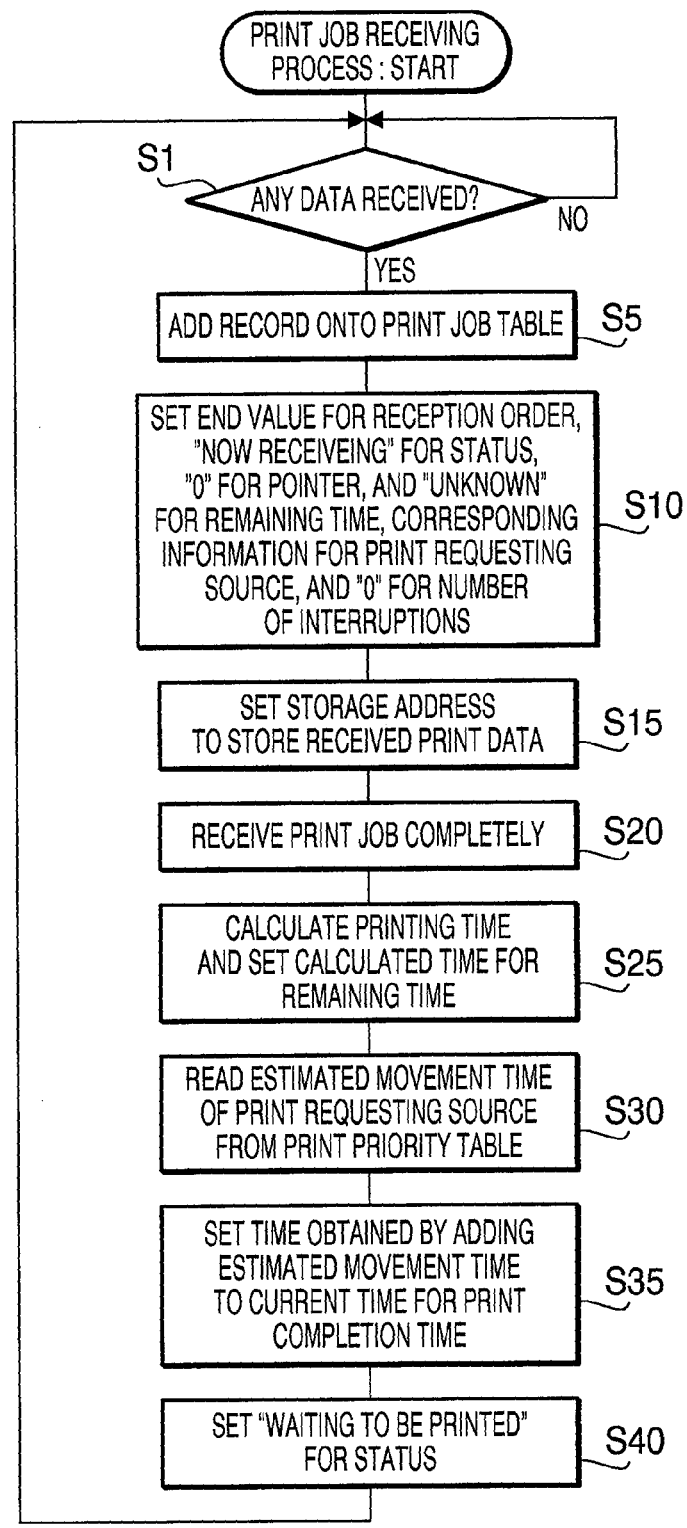
FIG. 5 is a flowchart showing a print job receiving process in the first embodiment according to one or more aspects of the present invention.

When receiving a print job (print data file) transmitted by a computer, the printer 10 creates a print job table as shown in FIG. 3 in accordance with a flowchart shown in FIG. 5, and rasterizes the received print job, generally, in accordance with a reception order set on the print job table, and then perform printing with the printing unit 11 based on the rasterized print job. It is noted that FIG. 5 is a flowchart showing a print job receiving process.

Further, as shown in FIG. 3, there are set on the print job table, items of a reception order, status, storage address, pointer, remaining time, print completion time, print requesting source, number of interruptions, medium, and number of switching operations. For the item of reception order, there is set a number (information) representing an order in which a corresponding print job is received. For the item of status, there is set a working status of the print job such as "now printing," "waiting to be printed," and "now receiving."

In addition, for the item of storage address, there is set a memory address to store the print job. For the item of pointer, there is set information representing a location, on the basis of a start location of job data constituting the print job, where the printing operation is actually completed. For the item of remaining time, there is set a time period required for printing remaining job data from the location specified by the pointer, namely, a time period necessary for completing the printing of non-printed job data.

For the item of print completion time, there is set a clock time when a user who has issued a print command is assumed to come to the printer 10 to pick up a printed matter therefrom. Ideally, it is desired that the printing operation of the print job in response to the print command is completed at the print completion time.

In the present embodiment, the print completion time is defined as a clock time obtained by adding, to a clock time when the print job has been received, a time period assumed to be taken for the user to move from a computer which has issued a print command of the print job transmitted, namely, a sending source of the print job to the printer 10 (hereinafter referred to as a estimated movement time). Further, the estimated movement time is previously configured by the user (including a service man) or a maker, and is stored on a print priority table as shown in FIG. 4.

For the item of print requesting source, there is set information representing a sending source of a corresponding print job of a print command issued. In the present embodiment, the print requesting source is configured based on a connection terminal (interface) through which the print job is received.

For the item of number of interruptions, there is set a number representing how many times there is carried out an operation to interrupt a print job in execution and perform another print job (hereinafter referred to as interruption process). Further, as shown in FIG. 5, there is secured in a rewritable storage means such as a RAM, an area (hereinafter referred to as a record) to write thereinto information such as a storage address and remaining time for a received print job. Thereafter, with the information being written into the record, the print job table is created. After receiving the print job, intended information on the print job table is updated as required in process of printing.

It is noted that the flowchart shown in FIG. 5 represents a control process to be booted when the printer 10 is powered on, which control process is terminated when the printer 10 is powered off. When the control process shown in FIG. 5 is booted, it is judged whether there is any print job to be received (S1). When it is judged that there is a print job to be received (S1: Yes), a new record for the print job received is added onto the print job table (S5).

Subsequently, there are set a number representing an end of the print order in a field for the print order of the added record, "now receiving" in a field for the status, "0" in a field for the pointer, "unknown" in a field for the remaining time, information corresponding to an interface that has received the print job (in case where the print job has been received through LAN, information corresponding to a subnet address of a sending source) in a field for the print requesting source, and "0" in a field for the number of interruptions (S10). Then, a memory address to store the print job as currently being received is set in a field for the storage address (S15).

After the receiving of the print job is completed (S20), the received print data are analyzed, and the remaining time taken for completing the print job is calculated and set as "(the number of pages of the print job)×(predetermined time period)" (S25). Next, a estimated movement time corresponding to the print requesting source is read out from the print priority table (see FIG. 4) (S30). Then, the print completion time is set by adding the estimated movement time read out to the current time (clock time when the print job has been received) (S35).

Subsequently, "waiting to be printed" is set in the field for the status, and it is again judged whether there is any print job to be received (S1).

2.3. Print Priority Table (see FIG. 4)

The print priority table stores thereon a parameter denoting a print priority order of a corresponding print job among print jobs for each interface that has received the print job. The parameters stored on the print priority table are saved in the storage unit 17, and therefore maintained even though the printer 10 is powered off.

Specifically, since a print job received via the first connection terminal 14 is sent with a command of direct printing, the print priority order thereof is the highest (print priority order: 1), and the estimated movement time therefor is set to be 0 minute.

Further, a print job received via the second connection terminal 15 is sent with the print command issued by the computer PCu directly connected with the printer 10. In this case, the user is generally assumed to be farther away from the printer 10 than the case where the command of direct printing is issued, and to be closer to the printer 10 than the case where the print command is issued by a computer connected with the printer 10 via the network.

In the present embodiment, the print priority order of the print job received via the second connection terminal 15 is set lower than that of the print job received via the first connection terminal 14 and higher than that of the print job received from the computer connected via the network (print priority order: 2). The estimated movement time of the print job received via the second connection terminal 15 is set longer than that of the print job received via the first connection terminal 14 and shorter than that of the print job received from the computer connected via the network (for example, set to be one minute).

In addition, among computers connected with the printer 10 via the network (NIC 16), a computer belonging to the same subnet as the printer 10 (NIC 16) is assumed to be closer to the printer 10 than computers belonging to any other subnets.

Thus, in the present embodiment, the print priority order of the computer belonging to the same subnet as the printer 10 (NIC 16) is set higher than those of the computers belonging to any other subnets (print priority order: 3). Additionally, the estimated movement time of the computer belonging to the same subnet as the printer 10 (NIC 16) is set shorter than those of the computers belonging to any other subnets (estimated movement time: 3 minutes). Furthermore, the print priority orders of the computers belonging to any other subnets ("192. 168. 2," "192. 168. 3," and "192. 168. 4") are the lowest (print priority orders: 4), and the estimated movement time thereof are the longest (5 minutes, 10 minutes, and 15 minutes, respectively).

It is noted that, in the printer 10 of the present embodiment, the print priority order is set for each print requesting source as a predetermined standard order at the time of shipment, while the estimated movement time is set by the user or a serviceman after the installation of the printer 10. At this time, in case where the estimated movement time has not yet set, the printer 10 is configured to inform of it.

For this reason, there can be a case where only the print priority order is set and the estimated movement time has not yet been set. As described later, in the present embodiment, a print job to be executed is determined based on the print priority order in case where the estimated movement time has not yet been set.

Incidentally, the print priority order and estimated movement time can arbitrarily be configured or changed by operating the operation panel 12. The print priority orders and estimated movement times shown in FIG. 4 are merely examples, and the present embodiment is not limited to those.

2.4. Print Control 2.4.1. Main Control

Figure 6:
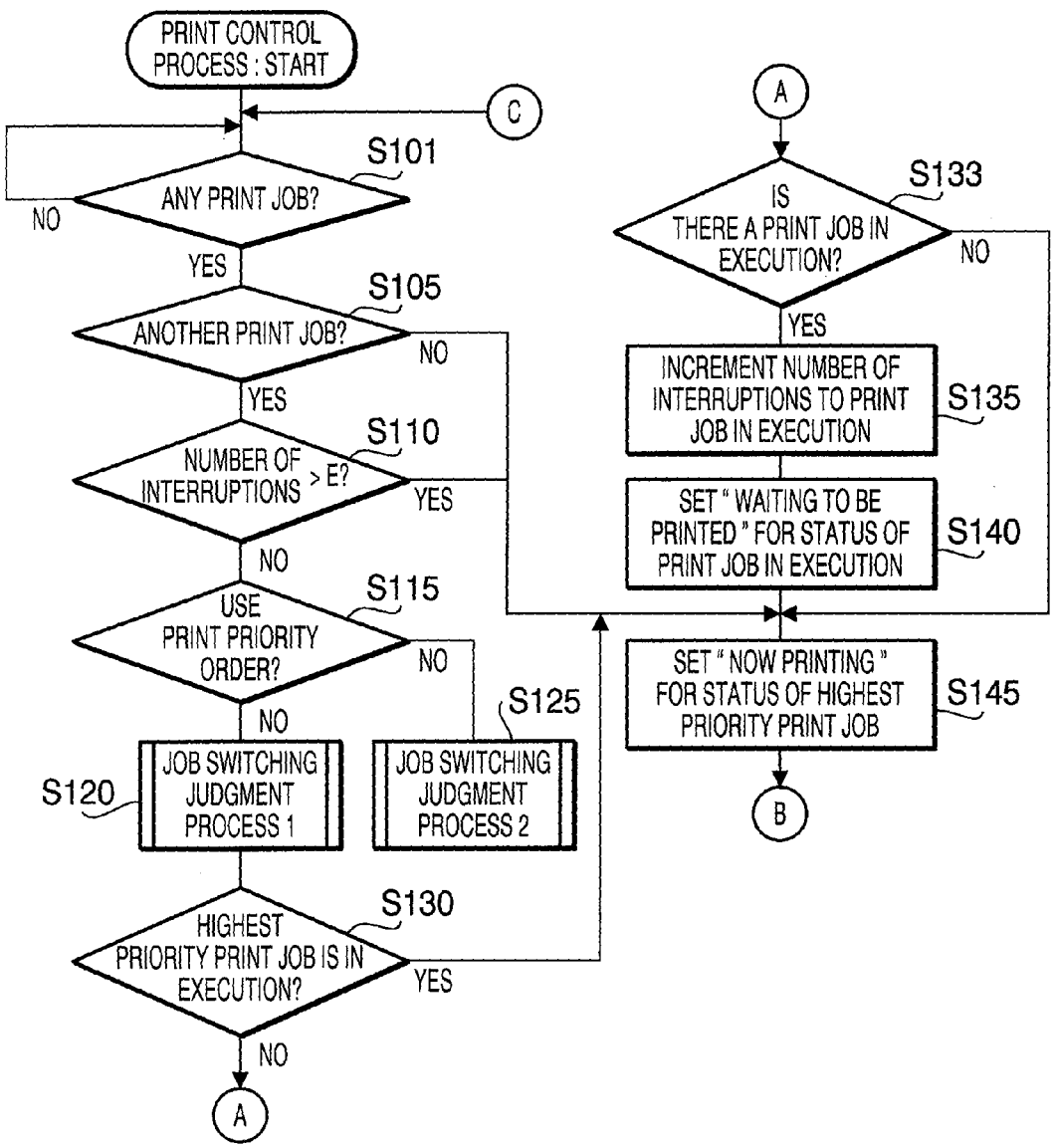
FIGS. 6 and 7 are flowcharts showing a print control process (main control process) to be executed in the printer in the first embodiment according to one or more aspects of the present invention.
Figure 7:
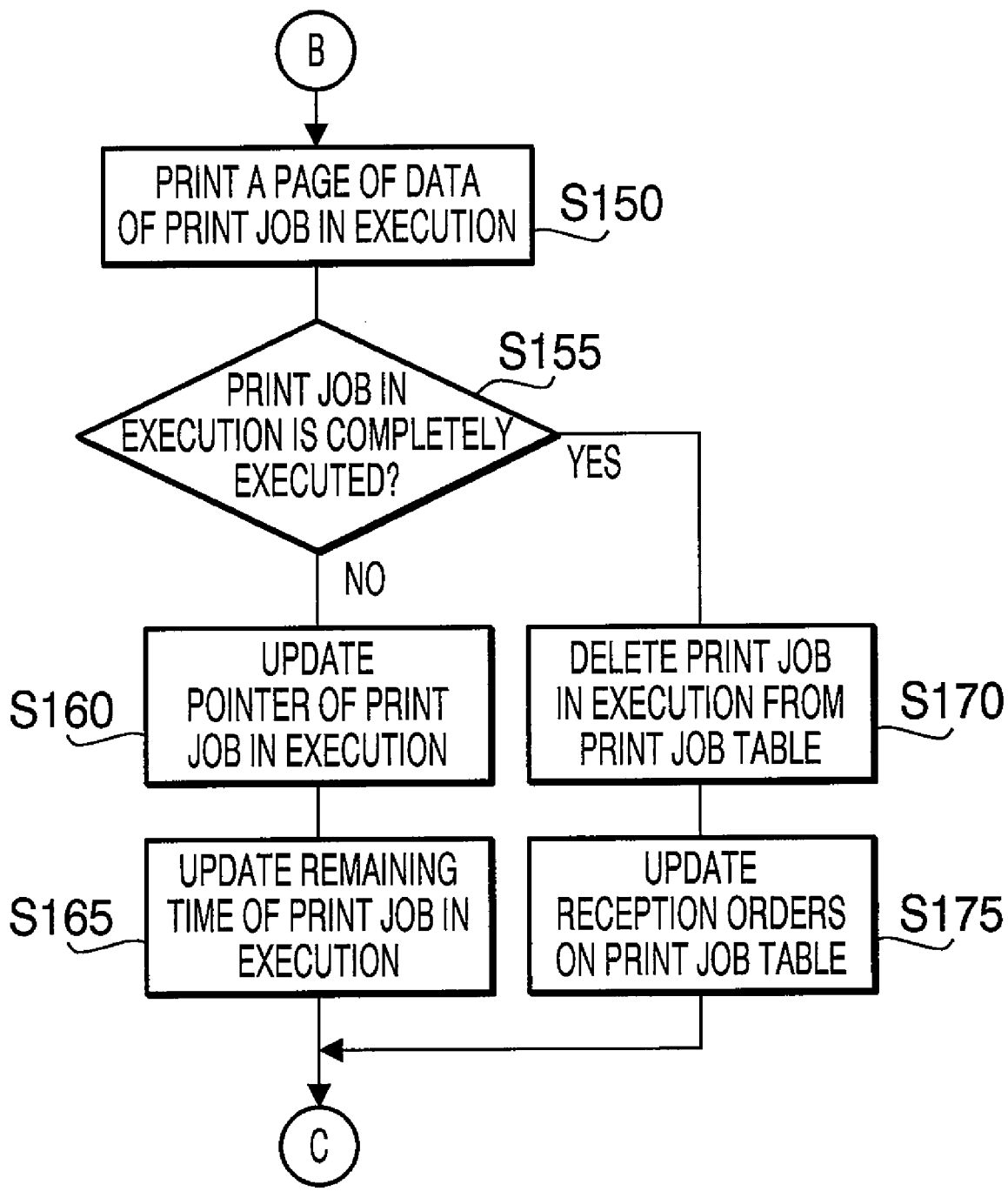

FIGS. 6 and 7 are flowcharts showing a print control process to be executed when the printer 10 is powered on. The print control process (FIGS. 6 and 7) and print job receiving process (FIG. 5) are executed independently in parallel while the printer 10 is being powered on.

When the print control process is booted, firstly, it is judged whether there is any print job on the print job table (S101). When it is not judged that there is any print job (S101: No), the printer 10 keeps waiting ready in this state.

It is noted that, in the present embodiment, the judgment of whether there is any print job on the print job table is made on the basis of whether a print job is registered in the top (with a reception order of "1") of the print job table.

When it is judged that there is a print job (S101: Yes), it is judged whether there is another print job, namely, whether there are a plurality of print jobs on the print job table (S105). When it is judged that there is another print job (S105: Yes), it is judged whether the number of interruptions (see FIG. 3)

of a print job which is currently set as a highest priority print job is more than a predetermined value E (S110).

It is noted that the highest priority print job denotes a print job which is actually executed in a below-mentioned S150. When a job switching judgment process (S120 or S125) has not yet been performed, namely, when the step S110 is executed for the first time after the present process is booted, a print job with a reception order of "1" is set as the highest priority print job.

At this time, when it is not judged that the number of interruptions of the print job which is currently set as the highest priority print job is more than the predetermined value E (S110: No), it is judged whether the print priority is determined using the print priority order set on the print priority table (S115).

Here, when the estimated movement time has not set, it is judged that the print priority is determined using the print priority order set on the print priority table. Meanwhile, when the estimated movement time has been set, it is not judged that the print priority is determined using the print priority order set on the print priority table.

When it is judged that the print priority is determined using the print priority order on the print priority table (S115: Yes), the highest priority print job is determined in a job switching process 1 (S120). Meanwhile, when it is not judged that the print priority is determined using the print priority order on the print priority table (S115: No), the highest priority print job is determined in a job switching process 2 (S125). It is noted that details of the job switching processes 1 and 2 will be described later.

Next, based on the print job table, it is judged whether the highest priority print job is in execution (S130). When it is not judged that the highest priority print job is in execution (S130: No), it is judged whether there is a print job in execution (S133). When it is judged that there is a print job in execution (S133: Yes), the number of interruptions of a print job with the status "now printing" on the print job table is incremented by one (S135). Then, the status of the print job is changed to "waiting to be printed" (S140).

Further, when it is not judged that there is a print job in execution (S133: No), a step S145 is performed without executing the steps S135 and S140. Then, the status of the highest priority print job is changed to "now printing" (S145), and thereafter the print job with the status "now printing" on the print job table (i.e., the highest priority print job) is executed to print one page from a current location of the pointer (S150).

In addition, when it is judged in S130 that the highest priority print job is in execution (S130: Yes), or it is not judged in S105 that there is another print job (S105: No), or it is judged in S110 that the number of interruptions of the highest priority print job is more than the predetermined value E (S110: Yes), the step S145 is preformed, and thereafter a page of data of the print job in execution (highest priority print job) is printed from a current location of the pointer (S150).

Subsequently, it is judged whether the print job of which one page has been printed in S150 is completely executed (S155). When it is not judged that the print job is completely executed (S155: No), the pointer and remaining time for the print job which has been executed in S150 are updated (S160 and S165), and thereafter the present process goes back to S100.

Meanwhile, when it is judged that the print job is completely executed (S155: Yes), the print job which has been executed in S150 is deleted from the print job table (S170). Then, the reception orders of print jobs which have received later than the deleted print job are updated on the print job table (S175), and the present process goes back to S100. It is noted that the updating of the reception orders denotes that the reception order of each print job received later than the deleted print job is modified to be earlier one.

2.4.2. Job Switching Process 1 (see FIG. 8)

Figure 8:
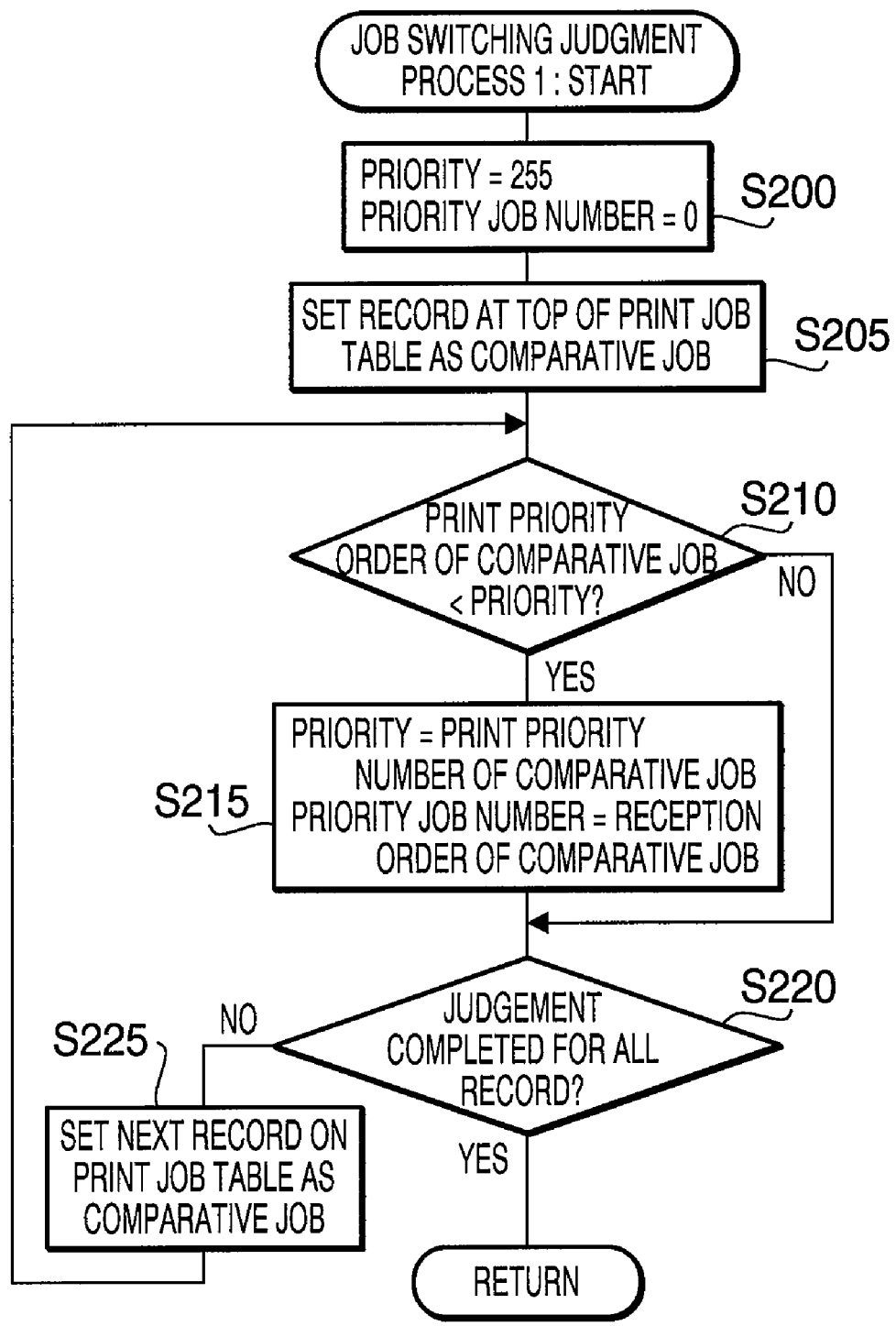
FIG. 8 is a flowchart showing a job switching judgment process 1 to be executed in the printer in the first embodiment according to one or more aspects of the present invention.

FIG. 8 is a flowchart showing a job switching judgment process 1. As shown in FIG. 8, when the job switching process 1 in S120 (see FIG. 6) is booted, firstly, "255" is substituted for a number representing priority as an initial value thereof, and "0" is substituted for a number representing the highest priority print job (hereinafter referred to as a priority job number) as an initial value thereof (S200).

Here, the priority denotes an order according to which a corresponding print job is actually executed. In the present embodiment, the smaller the value of the priority is, the earlier the corresponding print job is executed. Additionally, in the present embodiment, the priority job number corresponds to a number representing the reception order (see FIG. 3) given when the corresponding print job is received.

It is noted that a reason why "0" is substituted for the priority job number in S200 is that "0" is an initial value necessary for performing a following process and representing that the priority job number has not yet been set. Further, "255" is the maximum number configurable as the priority. Namely, in the present embodiment, a number higher than "255" or a priority lower than the priority represented by the value cannot be defined.

Subsequently, a record which is currently set at the top of the print job table is set as a comparative job (S205). Then, it is judged whether the print priority order of the comparative job (see FIG. 4) is less than the current priority (S210). When it is not judged that the print priority order of the comparative job is less than the current priority (S210: No), it is judged whether the process of comparing the priority is performed for each of the records (S220).

Meanwhile, when it is judged that the print priority order of the comparative job is less than the current priority (S210: Yes), the print priority order and reception order of the print job which is currently set as the comparative job are substituted for the priority and priority job number, respectively (S215). Thereafter, it is judged whether the process of comparing the priority is performed for each of the records (S220).

When it is judged that the process of comparing the priority is performed for each of the records (S220: Yes), the present process is terminated. Meanwhile, when it is not judged that the process of comparing the priority is performed for each of the records (S220: No), a next record on the print job table is set as the comparative job (S225). Then, it is judged again whether the print priority order of the comparative job is less than the current priority (S210).

2.4.3. Job switching Process 2 (see FIG. 9)

Figure 9:
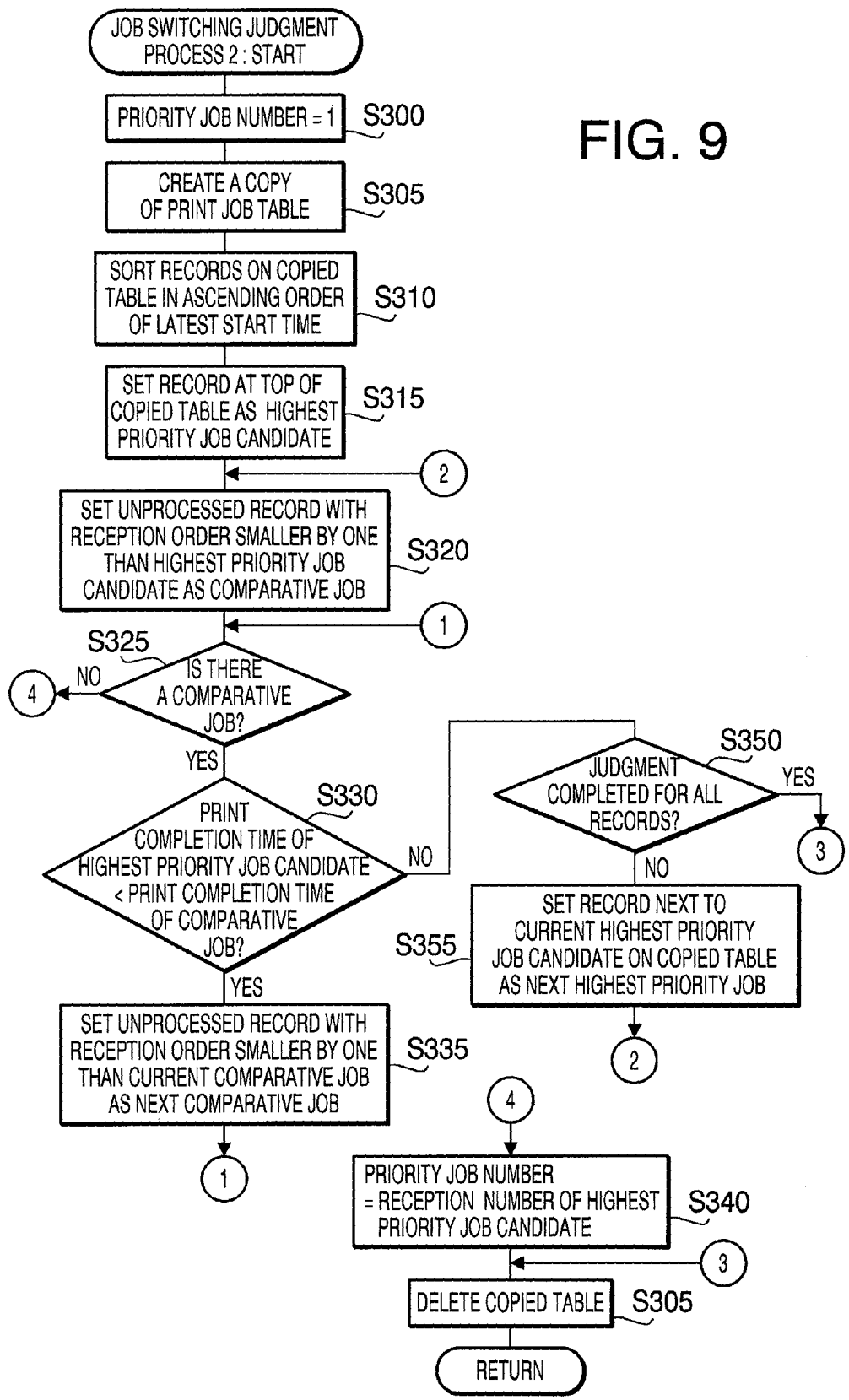
FIG. 9 is a flowchart showing a job switching judgment process 2 to be executed in the printer in the first embodiment according to one or more aspects of the present invention.

FIG. 9 is a flowchart showing a job switching judgment process 2. As shown in FIG. 9, when the job switching process 2 in S125 (see FIG. 6) is booted, firstly, "1" is substituted for the priority job number (S300). Thereafter, a copy of the print job table (hereinafter referred to as a copied table) is created (S305).

Next, the records (print jobs) on the copied table are sorted in ascending order such that a record with an earlier latest start time (note: a latest start time is defined as a clock time obtained by subtracting a corresponding remaining time from a corresponding print completion time) is placed in a higher position on the copied table (S310). Additionally, records with the same latest start time are sorted in ascending order based on the reception order.

Then, a record placed in the top position on the copied table with the records thereon sorted in S310 is set as a candidate of the highest priority print job (hereinafter referred to as the highest priority job candidate) (S315). Thereafter, there is set as the comparative job, a record, with a reception order thereof smaller (earlier) by one than that of the highest priority job candidate, for which a step S330 (print completion time judging process) has not yet been executed (S320).

Next, it is judged whether there is a print job as the comparative job, namely, whether there is a record set as the comparative job and an actual print job is set for the record (S325). When it is judged that there is a print job as the comparative job (S325: Yes), it is judged whether the print completion time of the highest priority job candidate is earlier than that of the comparative job (S330).

When it is judged that the print completion time of the highest priority job candidate is earlier than that of the comparative job (S330: Yes), there is newly set as the comparative job, a record with a reception order thereof smaller (earlier) than that of the current comparative job by one (S335). Then, it is judged again whether there is a print job as the comparative job (S325).

Meanwhile, when it is not judged that the print completion time of the highest priority job candidate is earlier than that of the comparative job (S330: No), it is judged whether the print completion time judging process in S330 is performed for each of the records (print jobs) (S350). When it is judged that the print completion time judging process in S330 is performed for each of the records (S350: Yes), the copied table is deleted (S345), and thereafter the present process is terminated.

Meanwhile, when it is not judged whether the print completion time judging process in S330 is performed for each of the records (S350: No), there is newly set as the highest priority job candidate, a record next to the current highest priority job candidate on the copied table with the records thereon sorted in S310 (S355). Thereafter, there is set as the comparative job, a record, with a reception order thereof smaller (earlier) than that of the highest priority job candidate by one, for which the print completion time judging process in S330 has not yet been executed (S320).

Meanwhile, when it is not judged that there is a print job as the comparative job (S325: No), a number representing the reception order of the highest priority job candidate is substituted for the priority job number (S340). Thereafter, the copied table is deleted, and the present process is terminated (S345).

3. Features of the Printer in the Embodiment

In the present embodiment, the print priority is determined based on the sort of the interface (such as the first connection terminal 14, second connection terminal 15, and NIC 16) through which the print job is received. Therefore, it is possible to meet various sorts of connection conditions and respond to print requests issued by a plurality of devices.

Further, in the present embodiment, there are provided the print priority table which stores thereon parameters (such as the print priority order and estimated movement time) denoting the print priority among a plurality of sorts of interfaces. Then, based on the parameters stored on the print priority table, the print priority is determined. Therefore, it is possible to easily set an optimum print priority for each interface.

Furthermore, in the present embodiment, a print job issued by a device placed closer to the printer 10 can be executed with higher priority. Hence, it is possible to shorten a time period during which a user who has issued a print request from a device close to the printer 10 has to wait beside the printer 10.

In the meantime, when there are many devices such as computers connected with the printer 10 via the network, there is employed a method to manage the entire network in a state sectioned into a plurality of subnets (segments).

In the present embodiment, among the devices connected with the NIC 16 via the network, a device belonging to the same subnet as the NIC 16 is judged to be closer to the printer 10 than devices belonging to any other subnets. Thus, the judgment regarding the print priority can be made so as to conform to actual operation.

Additionally, in the job switching judgment process 2 of the present embodiment, the highest print job is determined in consideration of the remaining time. Therefore, in the present embodiment, the print priority can be determined in consideration of a data size of the print job as well as the sort of the interface.

Accordingly, in the present embodiment, since the print priority can be determined in consideration of a time period taken for an actual printing operation, it is possible to make the printer 10 more convenient and user-friendly. Further, in the present embodiment, each time a predetermined amount (in the present embodiment, one page) of data of the print job is printed, the print priority is re-determined. Thus, it is possible to appropriately determine the print priority so as to meet print requests varying momentarily.

Further, in the present embodiment, the highest priority print job is determined based on the latest start time and print completion time which is determined in consideration of the estimated movement time and the clock time when the print job has been received. Hence, it is possible to determine the print priority further appropriately.

Figure 10:
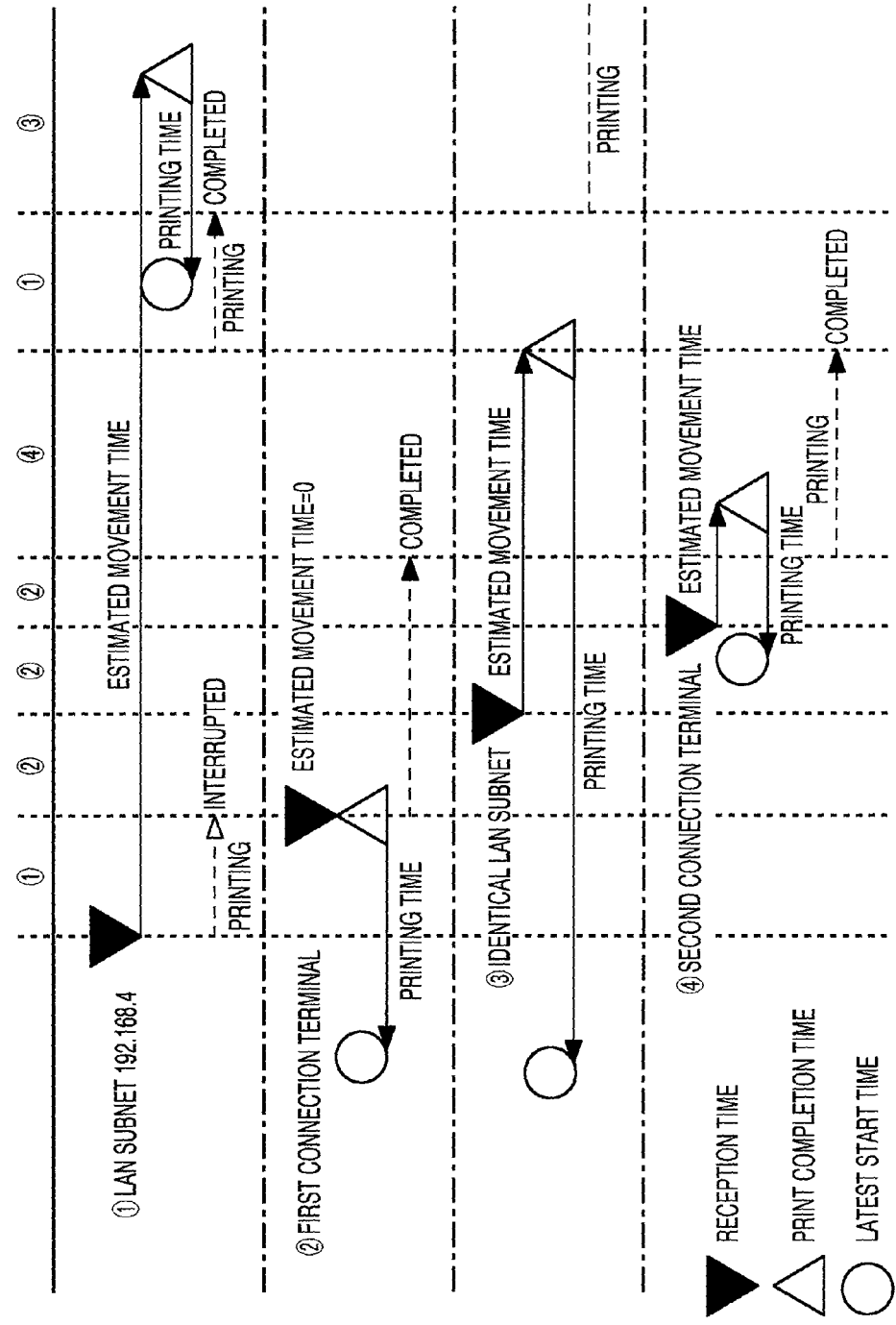
FIG. 10 is an example of a time chart showing job scheduling in the first embodiment according to one or more aspects of the present invention.

FIG. 10 is an example of a time chart showing job scheduling. In this time chart, time proceeds in the right direction. In an area sectioned in the horizontal axis by vertical dashed lines with a number attached thereto, a print job with a reception order represented by the number is executed.

Specifically, in FIG. 10, after the print job with the reception order 1 received from the subnet 192. 168. 4 is executed, the print job is interrupted, and the print job with the reception order 2 received from the first connection terminal 14 is executed until it is completed. Subsequently, the print job with the reception order 4 received from the second connection terminal 15 is executed until it is completed, and thereafter the print job with the reception order 3 received from the same subnet 192. 168. 1 is executed.

(Second Embodiment)

Figure 11:
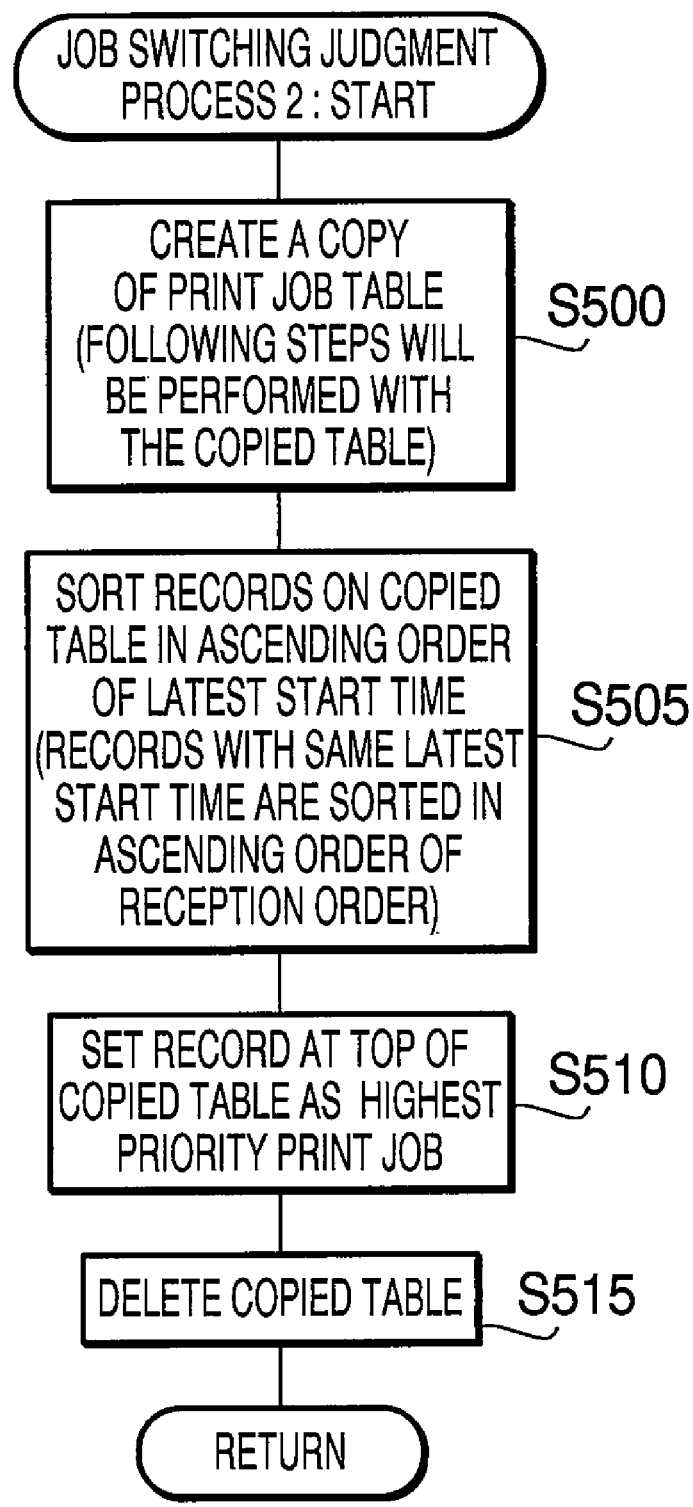
FIG. 11 is a flowchart showing a job switching judgment process 2 to be executed in the printer in a second embodiment according to one or more aspects of the present invention.

In a second embodiment, the job switching judgment process 2 of the first embodiment is more simplified. FIG. 11 is a flowchart showing a job switching judgment process 2 of the second embodiment.

As shown in FIG. 11, when the job switching judgment process 2 is booted, firstly, a copy of the print job table (copied table) is created (S500). Then, the records (print jobs) on the copied table are sorted in ascending order such that a record with an earlier latest start time (note: a latest start time is defined as a clock time obtained by subtracting a corresponding remaining time from a corresponding print completion time) is placed in a higher position on the copied table (S505). Additionally, records with the same latest start time are sorted in ascending order of the reception order.

Then, a record placed in the top position on the copied table with the records thereon sorted in S505 is set as the highest priority print job (S510). Thereafter, the copied table is deleted, and the present process is terminated (S515).

(Third Embodiment)

Figure 12:
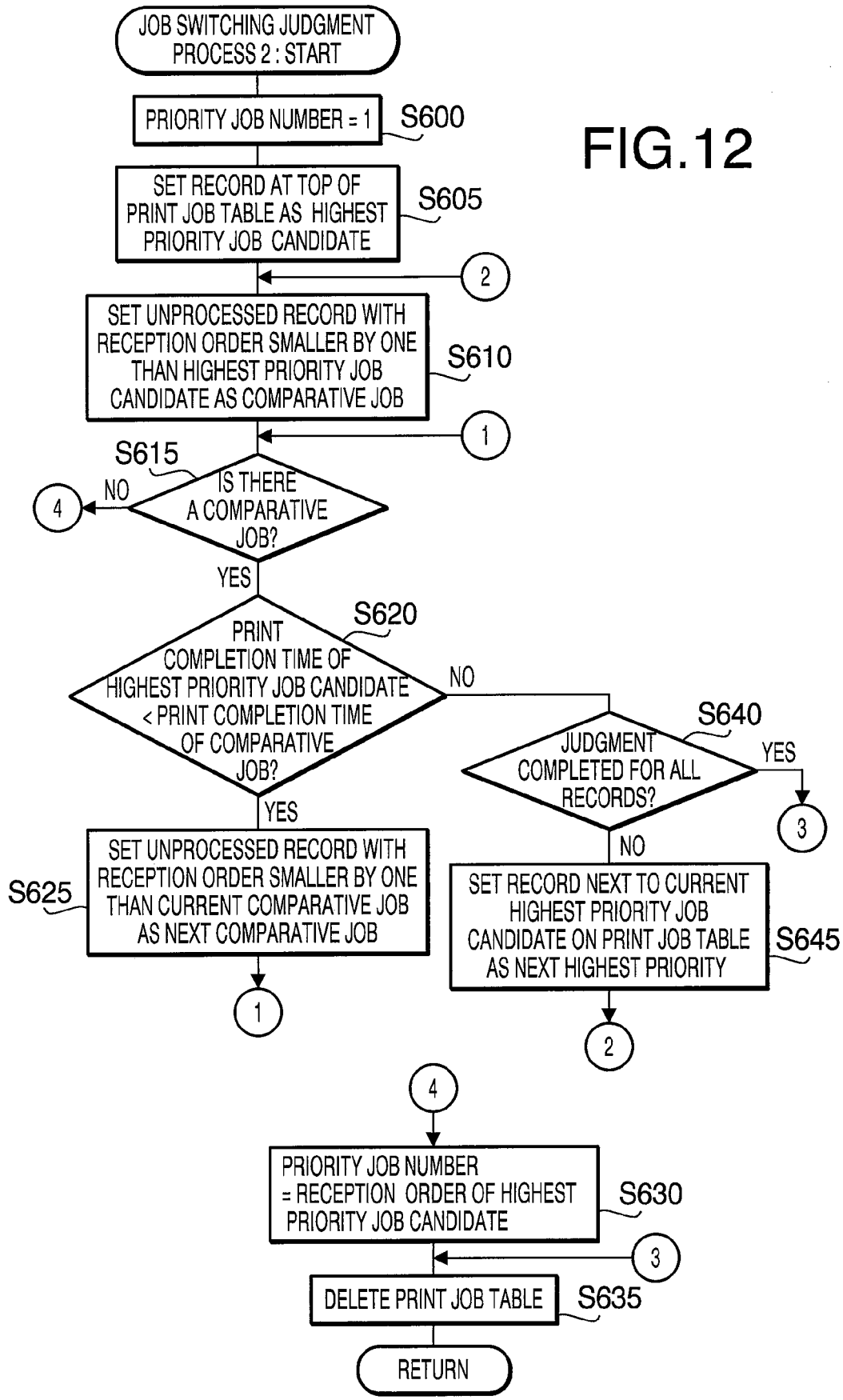
FIG. 12 is a flowchart showing a job switching judgment process 2 to be executed in the printer in a third embodiment according to one or more aspects of the present invention.

In the job switching judgment process 2 of the first embodiment, the highest priority print job is determined based on the latest start time, namely, based on the print completion time as well as the remaining time of each print job. In a third embodiment, the highest priority print job is determined only based on the print completion time. FIG. 12 is a flowchart showing a job switching judgment process 2 of the present embodiment.

As shown in FIG. 12, when the job switching judgment process 2 is booted, firstly, "1" is substituted for the priority job number (S600). Then, a record placed in the top position on the print job table is set as the highest priority job candidate (S605). Thereafter, there is set as the comparative job, a record, with a reception order thereof smaller (earlier) than that of the highest priority job candidate, for which a step S620 (print completion time judging process) has not yet been executed (S610).

Subsequently, it is judged whether there is a comparative job (S615). When it is judged that there is a comparative job (S615: Yes), it is judged whether the print completion time of the highest priority job candidate is earlier than that of the comparative job (S620).

When it is judged that the print completion time of the highest priority job candidate is earlier than that of the comparative job (S620: Yes), there is newly set as the comparative job, a record with a reception order thereof smaller (earlier) than that of the current comparative job by one (S625). Then, it is judged again whether there is a print job as the comparative job (S615).

Meanwhile, when it is not judged that the print completion time of the highest priority job candidate is earlier than that of the comparative job (S620: No), it is judged whether the print completion time judging process in S620 is performed for each of the records (print jobs) (S640). When it is judged that the print completion time judging process is performed for each of the records (S640: Yes), the print job table is deleted (S635), and the present process is terminated.

When it is not judged that the print completion time judging process is performed for each of the records (S640: No), there is newly set as the highest priority job candidate, a record next to the current highest priority job candidate on the print job table (S645). Thereafter, there is set as the comparative job, a record, with a reception order thereof smaller (earlier) than that of the highest priority job candidate by one, for which the print completion time judging process in S620 has not yet been executed (S610).

When it is not judged in S615 that there is a print job as the comparative job (S615: No), a number representing the reception order of the highest priority job candidate is substituted for the priority job number (S630). Thereafter, the print job table is deleted, and the present process is terminated (S635).

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

(Modifications)

In the aforementioned embodiments, it is judged which process is to be performed between the job switching judgment processes 1 and 2. However, for example, in the print control process as shown in FIGS. 6 and 7, only either the job switching judgment process 1 or the job switching judgment process 2 may be provided. Further, the user may previously set which process is to be performed between the job switching judgment processes 1 and 2.

Additionally, in the aforementioned embodiments, the print priority and estimated movement time are configured based on the distance between a device which issued a print command and the printer 10. However, for example, the print priority and estimated movement time may be configured based on a criterion, other than the distance from the printer 10, such as print frequency and a priority order of each department.

Further, in the aforementioned embodiments, each time a printing operation for a page of a print job is completed, the print priority is re-determined. However, for example, the print priority may be re-determined each time a printing operation for a predetermined amount (number of pages) of the print job is completed.

What is claimed is:

1. A printing device, comprising:
   a plurality of sorts of interfaces each of which is configured to receive therethrough a print job sent by a sending source device;
   a printing unit configured to perform a printing operation for the print job received through each of the interfaces;
   a determining unit configured to, for each print job:
   specify an estimated movement time that is a time period required for a user to move from the sending source device of the print job to the printing unit, based on a sort of an interface through which the print job is received;
   add the estimated move time to a first clock time that is established when the print job is received, to determine a second clock time that is a target completion time for the print job; and
   determine a print priority of the print job based on the second clock time;
   a control unit configured to control the printing unit to preferentially perform a printing operation for a print job with a higher print priority given thereto by the determining unit; and
   a storage unit configured to store thereon a plurality of estimated movement times in association with the plurality of sorts of interfaces, respectively;
   wherein the determining unit is configured to, for each print job, specify one of the estimated movement times stored on the storage unit, based on the sort of interface through which the print job is received.

2. The printing device according to claim 1, further comprising a setting unit configured to set a sort of an interface through which each of the print jobs is received in association with a distance between the printing device and a sending source device of the print job, and
   wherein the determining unit is configured to give a higher print priority to a print job received through an interface set by the setting unit in association with a shorter distance.

3. The printing device according to claim 2,
wherein the plurality of sorts of interfaces include at least two of a first interface connectable with an external storage device, a second interface directly connectable with a sending source device of a print job, and a third interface connectable with a sending source device via a network, and
wherein the setting unit sets a distance from a sending source of each print job received through each of the first, second, and third interfaces to be shorter in an order of the first, second, and third interfaces.

4. The printing device according to claim 3,
wherein the setting unit sets a distance from a device belonging to a subnet to which the third interface belongs, among the sending source devices connected with the third interface via the network, to be shorter than devices belonging to any other subnets.

5. The printing device according to claim 1,
wherein the determining unit determines the print priority based on a size of each of the print jobs as well as a sort of an interface through which the print job is received.

6. The printing device according to claim 1,
wherein the determining unit re-determines the print priority of each of the print jobs each time a predetermined number of pages of print data of a print job in execution is printed.

7. A method applicable to a printing device configured to receive print jobs through a plurality of sorts of interfaces, comprising the steps of:
specifying, for each print job, an estimated movement time that is a time period required for a user to move from the sending source device of the print job to the printing unit, based on a sort of an interface through which the print job is received;
adding the estimated move time to a first clock time that is established when the print job is received, to determine a second clock time that is a target completion time for the print job; and
determining a print priority of each of the print jobs based on the second clock time;
preferentially performing a printing operation for a print job with a higher print priority given thereto in the determining step determining step;
storing a plurality of estimated movement times in association with the plurality of sorts of interfaces on a storage unit; and
specifying, for each print job, one of the estimated move times stored on the storage unit, based on the sort of interfaces through which the print job is received.

8. The method according to claim 7, further comprising the step of setting a sort of an interface through which each of the print jobs is received in association with a distance between the printing device and a sending source device of the print job, and
wherein, in the determining step, a higher print priority is given to a print job received through an interface set in the setting step in association with a shorter distance.

9. The method according to claim 7,
wherein, in the determining step, the print priority is determined based on a size of each of the print jobs as well as a sort of an interface through which the print job is received.

10. The method according to claim 7,
wherein, in the determining step, the print priority of each of the print jobs is re-determined each time a predetermined number of pages of print data of a print job in execution is printed.

11. A non-transitory computer readable medium having computer readable instructions stored thereon, which cause a computer, configured to receive print jobs through a plurality of sorts of interfaces, to perform the steps of:
specifying, for each print job, an estimated movement time that is a time period required for a user to move from the sending source device of the print job to the printing unit, based on a sort of an interface through which the print job is received;
adding the estimated move time to a first clock time that is established when the print job is received, to determine a second clock time that is a target completion time for the print job;
determining a print priority of each of the print jobs based on the second clock time;
preferentially performing a printing operation for a print job with a higher print priority given thereto in the determining step;
storing a plurality of estimated movement times in association with the plurality of sorts of interfaces on a storage unit; and
specifying, for each print job, one of the estimated move times stored on the storage unit, based on the sort of interfaces through which the print job is received.

12. The computer readable medium according to claim 11,
wherein the computer readable instructions further comprise the step of setting a sort of an interface through which each of the print jobs is received in association with a distance between the computer and a sending source device of the print job, and
wherein, in the determining step, a higher print priority is given to a print job received through an interface set in the setting step in association with a shorter distance.

13. The computer readable medium according to claim 11,
wherein, in the determining step, the print priority is determined based on a size of each of the print jobs as well as a sort of an interface through which the print job is received.

14. The computer readable medium according to claim 11,
wherein, in the determining step, the print priority of each of the print jobs is re-determined each time a predetermined number of pages of print data of a print job in execution is printed.

* * * * *